(12) United States Patent
Micko

(10) Patent No.: US 6,340,816 B1
(45) Date of Patent: Jan. 22, 2002

(54) PYROELECTRIC DETECTOR WITH FEEDBACK AMPLIFIER FOR ENHANCED LOW FREQUENCY RESPONSE

(75) Inventor: Eric S. Micko, Rescue, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/242,243

(22) PCT Filed: Feb. 27, 1998

(86) PCT No.: PCT/US98/04009

§ 371 Date: Feb. 10, 1999

§ 102(e) Date: Feb. 10, 1999

(87) PCT Pub. No.: WO99/44020

PCT Pub. Date: Sep. 2, 1999

(51) Int. Cl.[7] .................................................. G01J 5/10
(52) U.S. Cl. .................................................. 250/338.3
(58) Field of Search ...................................... 250/338.3

(56) References Cited

U.S. PATENT DOCUMENTS

| 4,198,564 A | * 4/1980 | Baker et al. ............. 250/338.3 |
|---|---|---|
| 4,258,259 A | 3/1981 | Obara et al. |
| 4,418,335 A | 11/1983 | Genähr |
| 4,626,687 A | 12/1986 | Nara et al. |
| 4,827,133 A | 5/1989 | Zierhut |
| 4,868,390 A | 9/1989 | Keller et al. |
| 4,933,559 A | 6/1990 | Tamura et al. |
| 5,262,647 A | 11/1993 | Kumada |
| 5,352,895 A | 10/1994 | Inoue |
| 5,654,550 A | 8/1997 | Nomura et al. |
| 5,684,303 A | 11/1997 | Kim et al. |
| 5,949,072 A | * 9/1999 | Takada et al. ............. 250/338.3 |

FOREIGN PATENT DOCUMENTS

| GB | 2 206 202 A | 12/1988 |
|---|---|---|
| JP | 61-201121 A | 9/1986 |
| JP | 64-47920 A | 2/1989 |

* cited by examiner

Primary Examiner—Constantine Hannaher
(74) Attorney, Agent, or Firm—John P. O'Banion

(57) ABSTRACT

A pyroelectric detector circuit comprises a pyroelectric sensor element connected to a load resistor and to an input of a buffer amplifier having a feedback path for multiplying the resistance of the load resistor at non-zero frequencies. This feedback enables the use of a smaller load resistor which is multiplied to produce a higher effective load resistance necessary for proper low frequency response of the detector circuit.

20 Claims, 5 Drawing Sheets

US 6,340,816 B1

PYROELECTRIC DETECTOR WITH FEEDBACK AMPLIFIER FOR ENHANCED LOW FREQUENCY RESPONSE

TECHNICAL FIELD

This invention relates generally to a pyroelectric detector device and in particularly to a pyroelectric detector amplifier circuit having a feedback path for multiplying the resistance of a detector element resistor load at non-zero frequencies.

BACKGROUND ART

Pyroelectric detectors produce small amounts of electric charge whenever their temperature is changed. Often, these detectors are designed to undergo changes in temperature in response to incident electromagnetic radiation. Thus, an electric charge can be generated in response to any situation where electromagnetic radiation can change the temperature of the detector. The charge can be measured by electronic instrumentation which conveys a result in generally usable form.

Pyroelectric detectors are not typically used to measure steady temperatures (as with a thermometer). With pyroelectric detectors, such measurement would require precise accounting for very small amounts of electric charge, which is not practical with available technology. Therefore, pyroelectric detectors are used to measure changes in temperature. A detector designed to respond to electromagnetic radiation thus produces electric charge in response to changes in radiation incident upon it.

A typical application of a pyroelectric detector is to detect human beings who emit infrared light (a form of electromagnetic radiation). Optical elements are designed to focus infrared light from a certain volume of space onto a pyroelectric detector. A human being moving into the volume of space will cause a change in the amount of electromagnetic radiation incident upon the detector, which in turn will produce a small amount of electric charge in response. By adding electric instrumentation to such a combination of optics and detectors, a human motion sensor is created.

Charge from a pyroelectric detector may be measured in many different ways. One common method is to connect a load resistor ($R_L$) in parallel with the pyroelectric sensor element 2 positioned in a package adjacent to a window 1 as shown in FIG. 1, and to measure the transient voltage produced by the charge flowing from the pyroelectric sensor element 2 in response to a change in temperature. Due to the physical characteristics of the detector, the magnitude of the resultant voltage varies with the rate of temperature change. This variation is often described by means of a frequency response graph as shown in FIG. 2, which shows peak voltage per watt of incident energy (causing temperature change) versus the frequency of application of the energy.

When used in the parallel load resistor ($R_L$) configuration, pyroelectric detectors exhibit a peak response at a certain frequency. The load resistor is one element determining the location of the low frequency shoulder of the peak. Increasing the amount of load resistance moves the peak to a lower frequency. For many applications, a low frequency peak is desirable. However, the necessary load resistor may be in the hundreds of gigaohms. Resistances of this magnitude are difficult to fabricate. Moreover, instrumentation circuits utilizing such resistances are often problematic.

Another conventional pyroelectric detector is shown in FIG. 3 comprising an operational amplifier 8 used as a buffer for the pyroelectric sensor element 7 located in a package adjacent to a window 6. The operational amplifier adds a much smaller offset voltage than does the FET in FIG. 1 and it duplicates the pyroelectric sensor element 7 output voltage within a factor closer to unity (0.9995 to 1.0). However, these attributes are typically not critical to pyroelectric detector applications, so an FET is the amplifier element most commonly used because it is less expensive.

U.S. Pat. No. 5,352,895, issued Oct. 4, 1994 to Masao Inoue discloses a pyroelectric device comprising a pyroelectric member for detecting infrared radiation, and a field effect transistor (FET) connected to the pyroelectric member for amplifying the relatively small amount of electric charge produced in response to incident energy. Capacitors are connected to the source and drain of the FET for stabilizing an applied voltage and to cut high-frequency induced noise. A gate resistor is connected between the terminals of the pyroelectric member. The pyroelectric member is made of PVD or PZT materials and the gate resistor used for fire detection has a resistance ranging from 5 to 50 gigaohms and in particular claimed for 10 gigaohms. However, the FET amplifier does not provide for multiplying the resistance of the gate resistor 12 at non-zero frequencies.

U.S. Pat. No. 5,262,647, issued Nov. 16, 1993 to Akira Kumada discloses an infrared detector with a pyroelectric detector element and an operational amplifier having a chopper control circuit that enables the detector to sense either a moving person or temperature. A chopper mechanism interrupts an infrared ray input to the pyroelectric infrared detector element. A gain control circuit is connected to the operational amplifier for controlling the amplifier gain. However, the operational amplifier does not provide for multiplying the resistance of the load resistor at non-zero frequencies.

DISCLOSURE OF THE INVENTION

Accordingly, it is therefore an object of this invention to provide a feedback buffer amplifier for receiving the output of a pyroelectric detector element at the junction of a load resistor ($R_L$) for multiplying the resistance of the load resistor ($R_L$) at non-zero frequencies.

It is another object of the invention to enable the use of smaller resistances, which are easier to fabricate, in the pyroelectric detector by providing an effective load resistance as a result of feedback from a buffer amplifier output which multiplies the resistance of the load resistor.

It is a further object of the invention to more easily manage a quiescent (zero-frequency) output of the pyroelectric detector with smaller load resistors, in the presence of a buffer amplifier input bias current.

These and other objects are further accomplished by a pyroelectric detector comprising means for sensing infrared radiation, means connected in parallel with the sensing means for providing a load to measure the sensing means output, means coupled to the output of the sensing means for buffering the output, and a feedback means connected from an output to an input of the buffering means for producing multiplication of the resistance of the load. The sensing means comprises a pyroelectric ceramic material. The load means comprises a first resistor in series with a second resistor. The feedback means comprises a capacitor connected between the buffering means output and the load means. The buffering means comprises a field effect transistor. The buffering means comprises an operational amplifier. The buffering means comprises a gain of near unity. The multiplication of the load resistance improves a peak low frequency response of the sensing means. The buffering means comprises a source resistor for providing a buffered output of the sensing means output from the buffering means.

The objects are further accomplished by a pyroelectric detector comprising means for sensing infrared radiation, means connected in parallel with the sensing means for providing a load to measure the sensing means output, the load comprising a first load resistor in series with a second resistor, means coupled to the output of the sensing means for buffering the sensing means output, the buffering means comprising an output divider which includes a first source resistor connected in series with a second source resistor, and the detector further comprising a feedback means connected from the junction of the first source resistor and the second source resistor to the junction of the first load resistor and the second resistor for producing multiplication of the load. The sensing means comprises a pyroelectric ceramic material. The feedback means of the buffering means comprises a capacitor. The buffering means comprises a field effect transistor. The buffering means comprises a gain of near unity. The multiplication of the load resistor improves a peak low frequency response of the sensing means.

The objects are further accomplished by a method of providing a pyroelectric detector comprising the steps of sensing infrared radiation, connecting a load in parallel with means for sensing the infrared radiation, buffering the output of the sensing means with amplifier means, and providing a feedback means in the amplifier means connected from an output to an input of the amplifier means for producing multiplication of the resistance of the load. The step of sensing infrared radiation comprises the step of using a sensor having pyroelectric ceramic material. The step of connecting the load comprises the step of connecting a first resistor in series with a second resistor. The step of providing the feedback means comprises the step of connecting a capacitor between the amplifier means output and the load at the amplifier means input. The step of buffering the output of the sensing means comprises the step of using a field effect transistor. The step of buffering the output of the sensing means comprises the step of using an operational amplifier. The step of providing feedback for producing multiplication of the resistance of the load improves a peak amplitude of a low frequency response of the sensing means.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

BEST MODE FOR CARRYING OUT THE INVENTION

Figure 1:
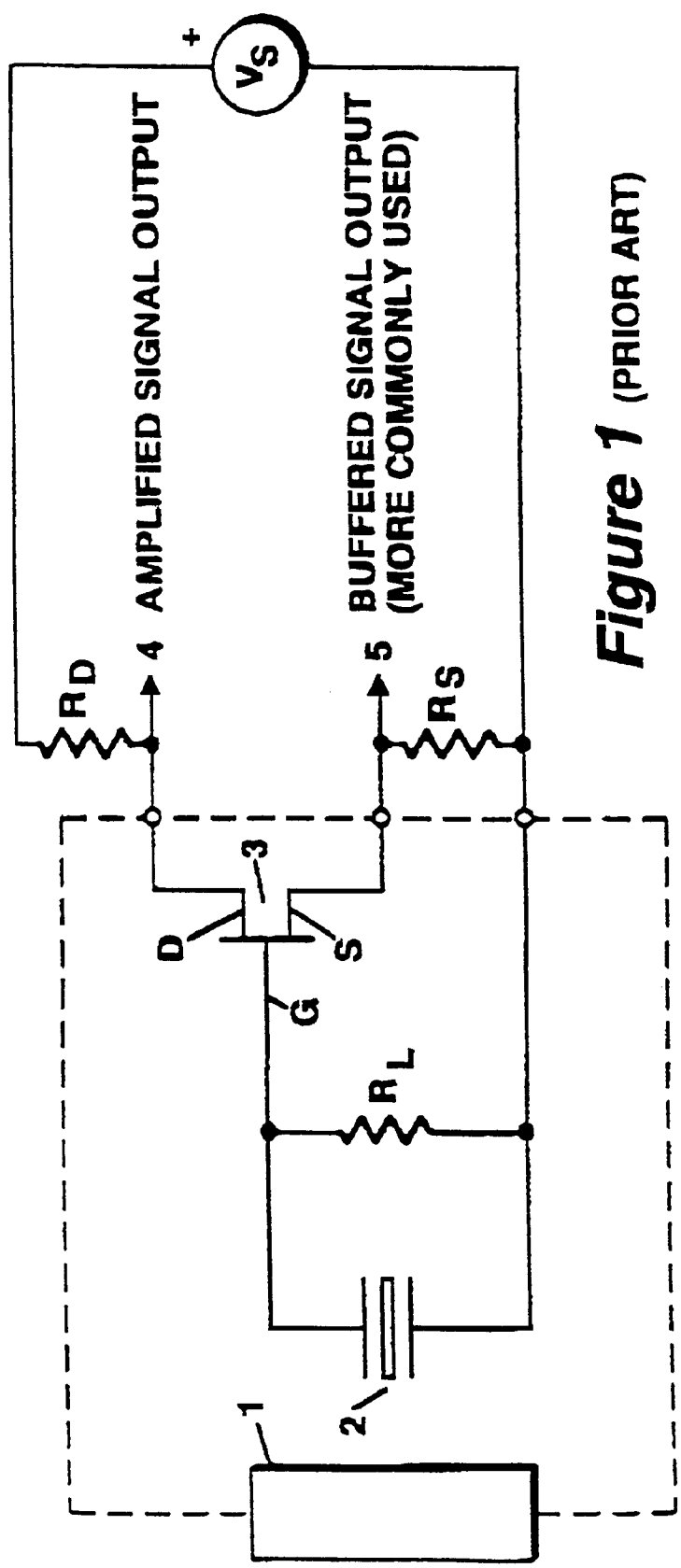
FIG. 1 is a circuit diagram of a conventional pyroelectric infrared radiation detector having a field effect transistor (FET) as an amplifying element.
Figure 2:
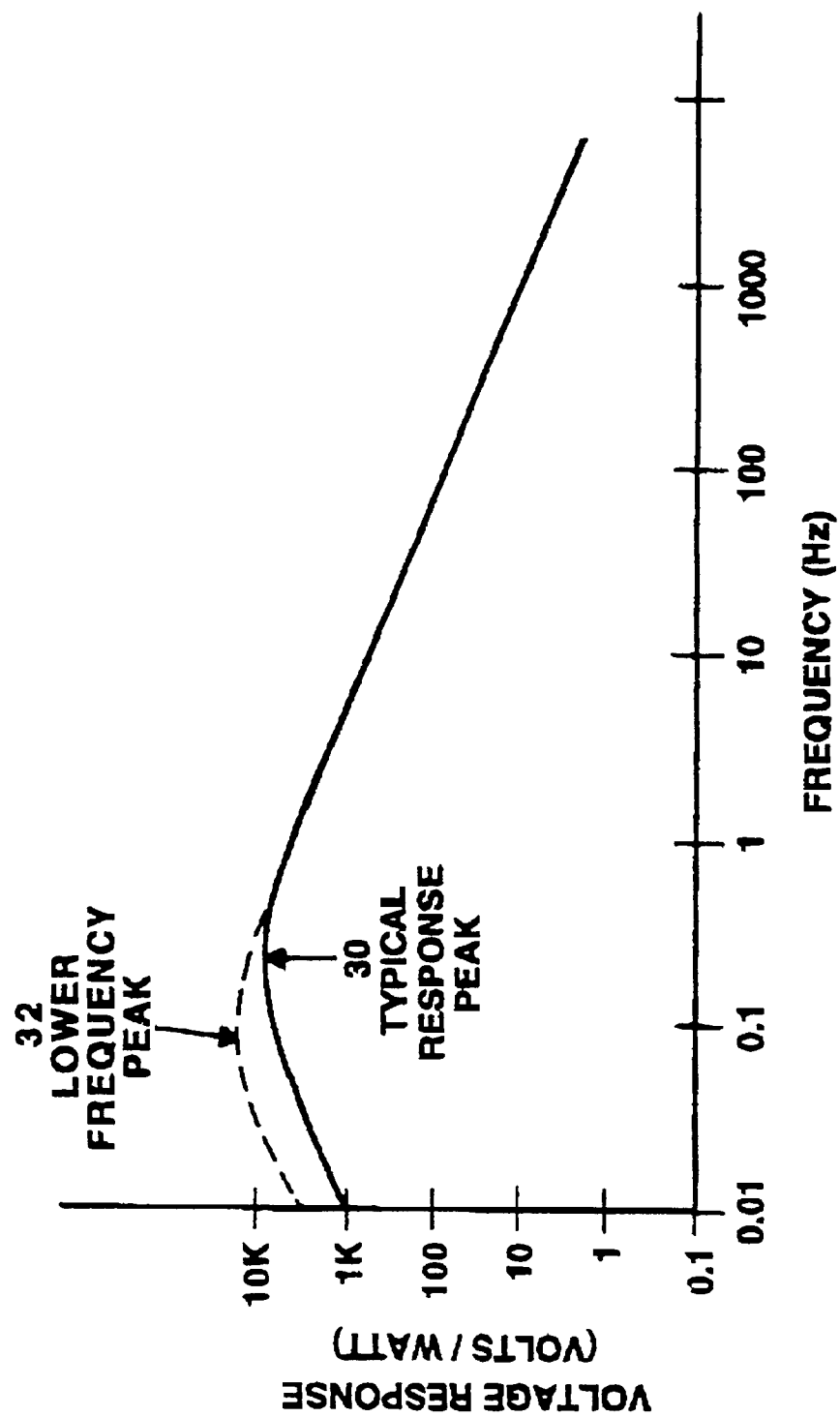
FIG. 2 shows a graph of the voltage response in volts/watt from a pyroelectric detector element versus the frequency of electromagnetic radiation incident on the detector element.
Figure 3:
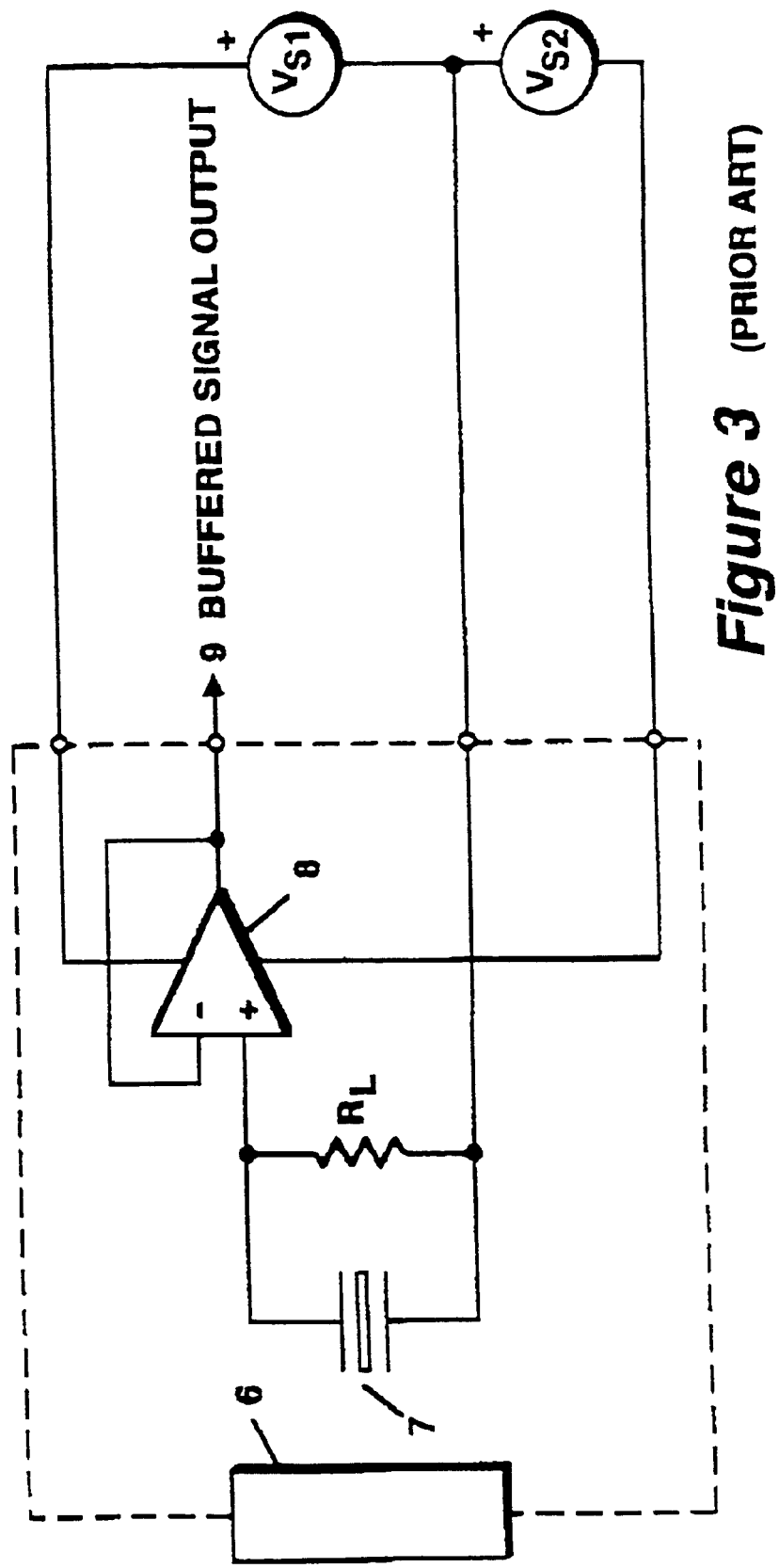
FIG. 3 is a circuit diagram of another conventional pyroelectric infrared radiation detector having an operational amplifier as an amplifying element.

Referring to FIG. 1, a pyroelectric detector as known in the prior art is shown comprising a pyroelectric sensor element 2 located adjacent to a package window 1, a load resistor ($R_L$) connected between the terminals of the pyroelectric sensor element 2, a field effect transistor (FET) 3, a drain resistor $R_D$ connected between an FET 3 drain terminal and a voltage source ($V_s$), and a source resistor ($R_S$) connected between an FET 3 source terminal and the return side of the voltage source ($V_S$). Infrared radiation passes through the window 1 and an optical filter (not shown) and is received in the pyroelectric element 2. The $R_S$ and $R_D$ resistors and the voltage source ($V_S$) are externally connected to the packaged pyroelectric element 2 with its $R_L$ and amplifier FET 3. A buffered signal output 5 is provided at the source (S) of FET 3. With the addition of an offset voltage between the FET gate (G) and source (S), the voltage from the pyroelectric sensor element 2 is duplicated at the FET 3 source (S) within a gain factor between 0.95 and 1.0. Less commonly used is the amplified signal output 4 at the FET 3 drain (D).

Figure 4:
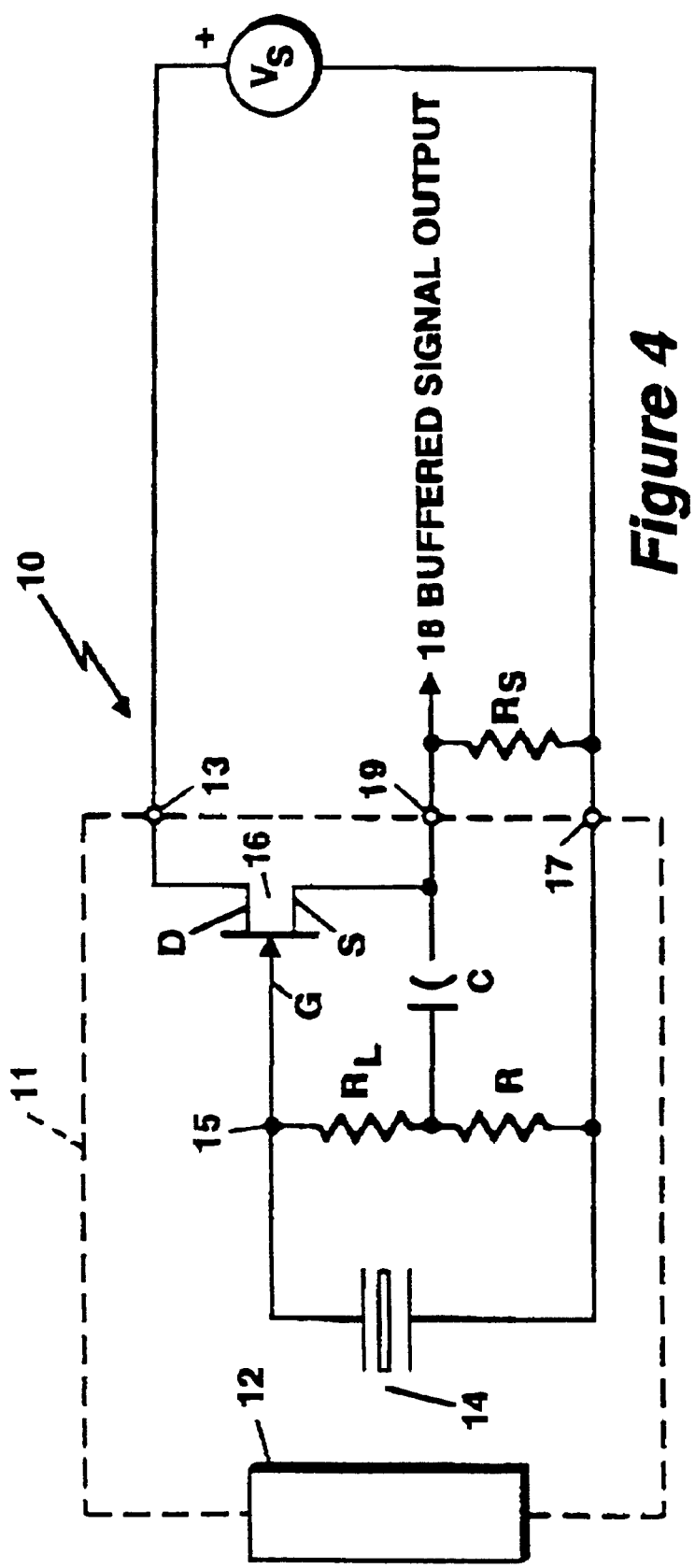
FIG. 4 is a circuit diagram of a pyroelectric infrared radiation detector according to the present invention.

Referring now to FIG. 4, a pyroelectric detector 10 circuit diagram of an embodiment of the present invention is shown. The circuit diagram of the pyroelectric detector 10 shows a package 11 having a window 12 with an external source resistor ($R_S$) connected to a source terminal 19 and voltage source ($V_S$) connected to a drain terminal 13. The package 11 comprises a pyroelectric sensor element 14 positioned within the package 11 adjacent to window 12 with an optical filter (not shown) for preventing white light from affecting the sensor element 14, a resistor network having a load resistor ($R_L$) in series with a resistor R connected between the terminals of the pyroelectric sensor element 14, and a field effect transistor 16 having a gate (G) connected to an output terminal of the pyroelectric sensor element 14 and $R_L$ at node 15. Further, there is a capacitor (C) connected between the source terminal 19 of FET 16 and the junction of series resistors $R_L$ and R. The junction of resistor R and the second terminal of the pyroelectric element are connected to terminal 17 of package 11. The source resistor ($R_S$) is connected externally between the FET 16 source terminal 19 and terminal 17. The positive terminal of voltage source ($V_S$) is connected to the drain terminal 13 of FET 16 and the return side of $V_S$ is connected to terminal 17 of package 11. A buffered signal output 18 voltage is measured at the source (S) of FET 16 across resistor R $_S$.

Still referring to FIG. 4, feedback is introduced from the source output of buffer FET 16 to the gate input of buffer FET 16 via capacitor C and load resistor $R_L$. The effect of this feedback is to multiply the value of the load resistor $R_L$ by the following factor at typical measurement frequencies:

$$\frac{1}{1 - (\text{buffer } FET \text{ gain factor})}$$

At zero frequency the load resistance equals the non-multiplied value of $R_L + R$. The resistance R may be selected to be much smaller than $R_L$ and determines along with capacitor C the time at which the feedback path becomes active. Thus, at zero frequency, where C is an open circuit, the load resistance $R + R_L$ approximately equals $R_L$. Conversely, at frequencies substantially above $\frac{1}{2\pi RC}$, where C can be regarded as a short circuit, the load resistance approximately equals:

$$\frac{R_L}{1 - (\text{buffer } FET \text{ gain factor})}$$

The product RC may be increased as desired to produce extended low frequency response of the pyroelectric sensor/buffer circuit, until thermal response of the detector sensor element 14 limits low frequency response. The extension is accomplished without excessively high resistances for $R_L$ since $R_L$ is multiplied at frequencies substantially above ½πRC. At zero frequency, however, the buffer FET 16 sees a detector element load of essentially only $R_L$ which eases the requirement for its input bias current, which could cause excessive offset voltage if flowing into a resistance many times greater than $R_L$. For convenience, if a zero frequency load of $2R_L$ is tolerable, R may be equal to $R_L$. Because of the variation in buffer gain factor, especially in FET buffers, the gain factor can be reduced and made less dependent on the buffer circuit characteristics. This results in a smaller but more accurate $R_L$ multiplication.

Although the particular components of the pyroelectric detector circuit of FIG. 4 may vary depending on a particular application, the preferred embodiment comprises the following: The pyroelectric sensor element 14 may be embodied by a pyroelectric ceramic sensor as provided in Part No. LHi888 manufactured by EG&G Heimann Optoelectronics of Montgomeryville, Pa. The FET 16 may be embodied by a 2N4338 device which is available from many sources. The load resistor $R_L$ is 20 gigaohms, R is 2 gigaohms, C is 27 nanofarads and $R_S$ is 47 kiloohms. The source voltage ($V_S$) is 0.5 volts.

Figure 5:
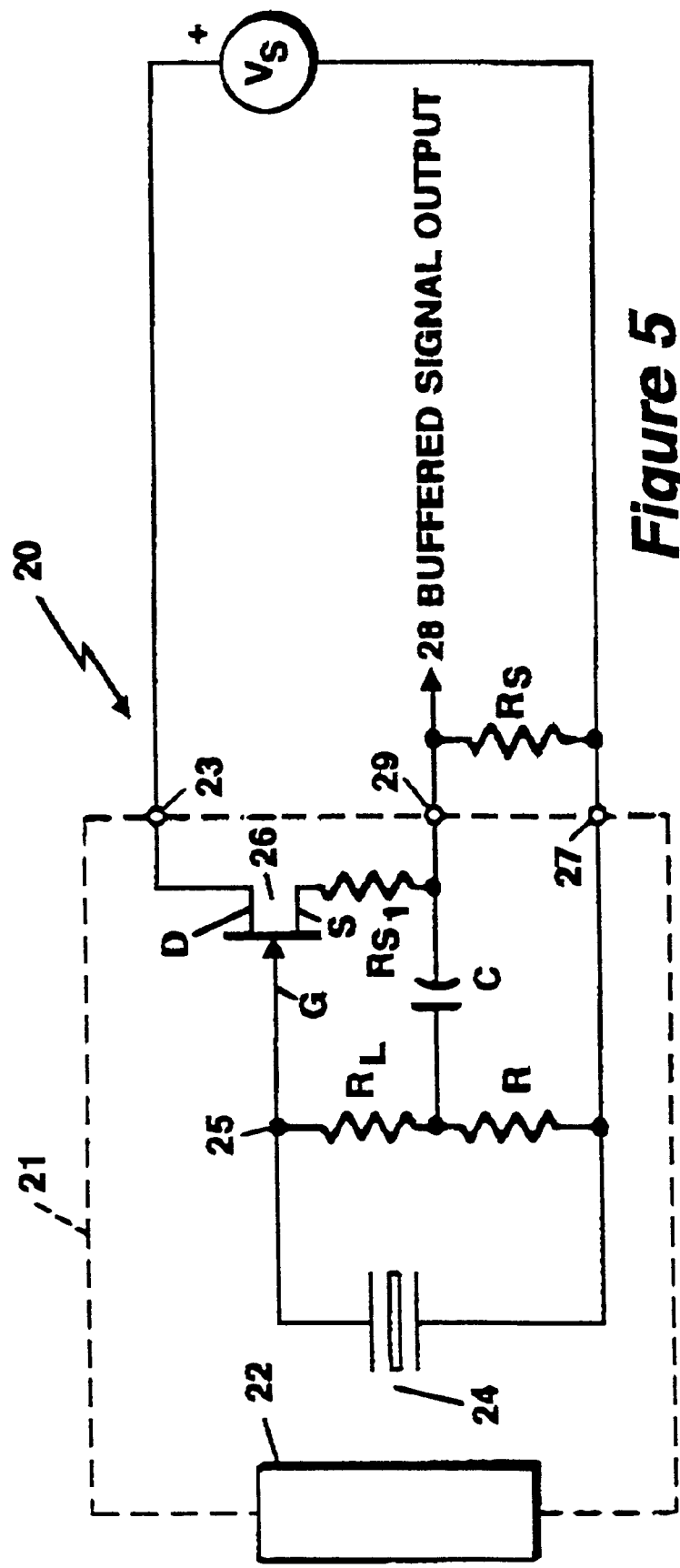
FIG. 5 is a circuit diagram of an alternate embodiment of a pyroelectric infrared radiation detector according to the present invention.

Referring now to FIG. 5, an alternate embodiment of a pyroelectric detector 20 is shown according to the present invention providing a method of gain factor reduction. Pyroelectric detector 20 comprises a package 21 having a window 22 with an optical filter (not shown) and an external source resistor ($R_S$) connected to a source terminal 29 and a voltage source ($V_S$) connected to a drain terminal 23. The package 21 comprises a pyroelectric sensor element 24 positioned within the package 21 adjacent to window 22, a resistor network having a load resistor $R_L$ in series with resistor R, said network connected between terminals of pyroelectric sensor element 24, and a field effect transistor 26 with the gate (G) connected to the output terminal of the pyroelectric sensor element 24 and $R_L$ at node 25. Further, the capacitor (C) is connected between the junction of the series resistor network, $R_L$ and R, and terminal 29 at the junction of series resistors $R_{S1}$ and $R_S$ which form an output divider with resistance values several orders of magnitude smaller than $R_L$. The output divider of $R_{S1}$ and $R_S$ provides for a smaller but more accurate load resistance multiplication. The positive terminal of voltage source $V_S$ is connected to the drain 23 of FET 26 and the return side of $V_S$ is connected to terminal 27 and $R_S$. The buffered signal output 28 voltage is measured at terminal 29 at the divider junction of $R_{S1}$ and $R_S$.

Because of the variation in buffer gain factor, especially in FET buffers, the gain factor is reduced in the pyroelectric detector 20 of FIG. 5 which results in the smaller but more accurate $R_L$ multiplication. The net gain factor is equal to:

$$\frac{(FET \text{ gain factor})(R_S)}{R_{S1} + R_S}$$

The pyroelectric detector 20 components shown in FIG. 5 may be embodied by the same components as the pyroelectric detector 10 in FIG. 4 except for the additional resistor $R_{S1}$ which has a value of 4.7K ohms.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A pyroelectric detector comprising:
   means for sensing infrared radiation;
   means connected in parallel with said sensing means for providing a load to measure said sensing means output, wherein said load means comprises a first resistor in series with a second resistor;
   means coupled to said output of said sensing means for buffering said output; and
   said detector comprises a feedback means connected from an output to an input of said buffering means for producing multiplication of the resistance of said load.

2. The pyroelectric detector as recited in claim 1 wherein said sensing means comprises a pyroelectric ceramic material.

3. The pyroelectric detector as recited in claim 1 wherein said feedback means comprises a capacitor connected between said buffering means output and said load means.

4. The pyroelectric detector as recited in claim 1 wherein said buffering means comprises a field effect transistor.

5. The pyroelectric detector as recited in claim 1 wherein said buffering means comprises an operational amplifier.

6. The pyroelectric detector as recited in claim 1 wherein said buffering means comprises a gain of near unity.

7. The pyroelectric detector as recited in claim 1 wherein said multiplication of said load resistance improves a peak low frequency response of said sensing means.

8. The pyroelectric detector as recited in claim 1 wherein said buffering means comprises a source resistor for providing a buffered output of said sensing means output from said buffering means.

9. A pyroelectric detector comprising:
   means for sensing infrared radiation;
   means connected in parallel with said sensing means for providing a load to measure said sensing means output, said load comprising a first load resistor in series with a second resistor;
   means connected to said output of said sensing means for buffering said sensing means output;
   said detector comprises an output divider which includes a first source resistor connected in series with a second source resistor; and
   said detector comprises a feedback means connected from the junction of said first source resistor and said second source resistor to the junction of said first load resistor and said second resistor for producing multiplication of said load.

10. The pyroelectric detector as recited in claim 9 wherein said sensing means comprises a pyroelectric ceramic material.

11. The pyroelectric detector as recited in claim 9 wherein said feedback means comprises a capacitor.

12. A pyroelectric detector as recited in claim 9 wherein said buffering means comprises a field effect transistor.

13. The pyroelectric detector as recited in claim 9 wherein said buffering means comprises a gain of near unity.

14. The pyroelectric detector as recited in claim 9 wherein said multiplication of said load resistor improves a peak low frequency response of said sensing means.

15. A method of providing a pyroelectric detector comprising the steps of:

sensing infrared radiation;

connecting a load in parallel with means for sensing said infrared radiation, wherein said step of connecting said load comprises the step of connecting a first resistor in series with a second resistor;

buffering said output of said sensing means with amplifier means; and providing a feedback means in said amplifier means for producing multiplication of the resistance of said load.

16. The method as recited in claim 15 wherein said step of sensing infrared radiation comprises the step of using a sensor having pyroelectric ceramic material.

17. The pyroelectric detector as recited in claim 15 wherein said step of providing said feedback means comprises the step of connecting a capacitor between said amplifier means output and said load at said amplifier means input.

18. The method as recited in claim 15 wherein said step of buffering said output of said sensing means comprises the step of using a field effect transistor.

19. The method as recited in claim 15 wherein said step of buffering said output of said sensing means comprises the step of using an operational amplifier.

20. The method as recited in claim 16 wherein said step of providing feedback for producing multiplication of the resistance of said load improves a peak amplitude of a low frequency response of said sensing means.

* * * * *